United States Patent
Yamamoto et al.

(10) Patent No.: US 7,903,085 B2
(45) Date of Patent: Mar. 8, 2011

(54) ELECTRONIC DEVICE HAVING A POSITION SENSOR

(75) Inventors: Sado Yamamoto, Saitama (JP); Masamitsu Ito, Saitama (JP); Yasuo Oda, Saitama (JP); Andrew Tozer, Cambridge (GB); Ian Scholey, Huntingdon (GB)

(73) Assignee: Wacom Corporation Limited, Saitama (JP)

( * ) Notice: Subject to any disclaimer, the term of this patent is extended or adjusted under 35 U.S.C. 154(b) by 803 days.

(21) Appl. No.: 11/662,839

(22) PCT Filed: Sep. 24, 2004

(86) PCT No.: PCT/EP2004/010713
§ 371 (c)(1),
(2), (4) Date: Aug. 31, 2007

(87) PCT Pub. No.: WO2006/032294
PCT Pub. Date: Mar. 30, 2006

(65) Prior Publication Data
US 2008/0136793 A1    Jun. 12, 2008

(51) Int. Cl.
G09G 5/00       (2006.01)
G06F 3/041      (2006.01)
(52) U.S. Cl. .................. 345/156; 345/173; 345/181
(58) Field of Classification Search .............. 345/156, 345/173–181
See application file for complete search history.

(56) References Cited

U.S. PATENT DOCUMENTS

| 5,028,745 | A | 7/1991 | Yamanami |
| 5,057,998 | A | 10/1991 | Hirokawa |
| 5,134,689 | A | 7/1992 | Murakami |
| 5,488,204 | A | 1/1996 | Mead |
| 5,600,105 | A | 2/1997 | Fukuzaki |
| 5,942,733 | A | 8/1999 | Allen |
| 6,380,929 | B1 | 4/2002 | Platt |
| 6,485,306 | B1 | 11/2002 | Yeh |
| 6,667,740 | B2 | 12/2003 | Ely |
| 6,765,558 | B1* | 7/2004 | Dotson ............ 345/173 |
| 2003/0132922 | A1* | 7/2003 | Philipp ............ 345/173 |

FOREIGN PATENT DOCUMENTS

| JP | 3073052 A | 3/1991 |
| JP | 2003512682 T | 4/2003 |
| WO | 9800921 A2 | 1/1998 |
| WO | 0129759 A2 | 4/2001 |

OTHER PUBLICATIONS

International Search Report and Written Opinion for corresponding PCT/EP2004/010713.

(Continued)

*Primary Examiner* — Duc Q Dinh
(74) *Attorney, Agent, or Firm* — Matthew B. Dernier, Esq.; Gibson & Dernier LLP (57) ABSTRACT

The present invention provides an electronic device comprising: —a position sensor (102; 302; 502), —a first integrated circuit component (106; 306; 506) coupled to the position sensor for acquisition of position data (112; 312), —a memory (114; 314) for storing the position data, a second integrated circuit component (108; 308), wherein the first integrated circuit component comprises means (110; 348) for signalling the acquisition of the position data to the second integrated circuit component, the second integrated circuit component comprising means (108; 364, 374) for reading the position data from the memory in response to the signalling.

17 Claims, 5 Drawing Sheets

OTHER PUBLICATIONS

WACOM: Technology Online! XP002326465, www.wacom-components.com/english/tech.asp (2002).

WACOM: Wacom Displays Pressure Sensitive Pen Sensor for Tablet PCS Online!, XP002326466, www.wacom-components.com/english/news_and_events/nw0003.asp (Dec. 7, 2001).

WACOM: W8001 Digitizer Controller IC Online!, XP002326467, www/wacom-components.com/common/downloads/W8001.pdf (Jun. 2002).

WACOM: Wacom Components and Austriamicrosystems Complete Design of World's First Single Chip for Pen Based Mobile Interface Online!, XP002326468, www.wacom-components.com/english/news_and_events/nw0019.asp (Aug. 4, 2004).

International Search Report of International Application PCT/EP2005/010713.

Office Action for corresponding Japanese patent application No. 2007-532777 dated Jun. 2, 2009.

Gary L. Peterson, "Concurrent Reading While Writing" The University of Rochester, p. 45-55 (1983).

AN887 Application Note, "Microcontrollers Made Easy" STMicroelectronics, Microcontroller Divison Applications, pp. 1-12 (2000).

* cited by examiner

ELECTRONIC DEVICE HAVING A POSITION SENSOR

FIELD OF THE INVENTION

The present invention relates to the field of position detection, and more particularly to an electronic device such as a computer, a mobile phone, a personal handy phone system (PHS), a personal digital assistant (PDA), a mobile telecommunication device, a navigation system, an electronic organizer or another portable electronic device.

BACKGROUND AND PRIOR ART

Various position sensor technologies are known from the prior art including resistive and capacitive touch screens and inductive position sensors.

EP 0 259 894 B1 shows an inductive position detecting apparatus having a plurality of loop coils for sending and receiving electromagnetic signals and a position pointer having a tuning circuit. The position detection is performed by electromagnetic coupling. Similar inductive position sensing devices are known from EP 0307667 B1; U.S. Pat. No. 6,485,306 B1; U.S. Pat. No. 5,600,105; U.S. Pat. No. 6,667,740 B2.

Various capacitive pen entry position sensors are known from U.S. Pat. No. 5,488,204; U.S. Pat. No. 5,942,733 and U.S. Pat. No. 6,380,929.

The present invention aims to provide an improved electronic device having an position sensor, an improved integrated circuit component for coupling to a position sensor and an improved integrated circuit component for reading position data as well as corresponding methods and computer program products.

SUMMARY OF THE INVENTION

The invention provides an electronic device having a position sensor and a first integrated circuit component coupled to the position sensor for acquisition of position data. The electronic device has a memory for storing the position data and a second integrated circuit. The first integrated circuit comprises means for signalling an acquisition of the position data to the second integrated circuit and the second integrated circuit has means for reading the position data from the memory in response to the signalling.

The present invention is particularly advantageous for application to battery powered portable devices. In particular, the present invention facilitates to reduce the processing load of the second integrated circuit as the second integrated circuit reads the position data only in response to the signalling data. It is therefore not required that the second integrated circuit permanently reads the memory that receives the position data. As a consequence the power consumption of the second integrated circuit can be reduced which extends the battery lifetime.

In accordance with an embodiment of the invention the position sensor has a touch screen or a touch pad. For example, a resistive, capacitive or inductive touch screen or touch pad is utilized.

In accordance with an embodiment of the invention the position sensor has at least one conductor for electromagnetic coupling with an entry pen. The conductor is energized periodically in order to send an electromagnetic signal to the entry pen. The entry pen returns an electromagnetic signal that is received by the conductor in order to provide a position signal.

In accordance with an embodiment of the invention the position sensor is fixed behind a display, such as the display of a telecommunication device, personal digital assistant, navigation system or other portable electronic device.

In accordance with an embodiment of the invention the first integrated circuit component has analogue circuitry for driving the position sensor and logic circuitry for processing the position signal in order to provide position data.

In accordance with an embodiment of the invention, the first integrated circuit component has control means for periodically performing acquisitions of position data and generator means for providing an identifier for each position data set. The identifier is written to a predetermined memory location as well as the position data set. Preferably, the memory is overwritten with each new position data acquisition. The identifier value can be a counter value whereby the counter is incremented or decremented with each acquisition scan to obtain up-to-date position data.

In accordance with an embodiment of the invention the first integrated circuit component sends an interrupt to the second integrated circuit component in order to signal acquisition of new position data. The second integrated circuit component can use an interrupt handling routine in order prioritize the processing of the interrupts, including interrupts received from other applications.

In accordance with an embodiment of the invention the second integrated circuit component sequentially reads a first predetermined memory location that is assigned to the identifier of the position data set, a second memory location that is assigned to the position data set and again the first memory location. If the identifiers that are read from the first memory location are identical this implies that the position data set is valid. Otherwise this indicates that the first integrated circuit component has performed a write operation of newly acquired position data into the memory while the second integrated circuit component has performed the read operation. In order to obtain valid position data, the second integrated circuit component can retry the read operation to read valid position data from the memory after a failed read attempt.

In accordance with an embodiment of the invention, the first and second integrated circuit components are coupled by means of a data bus, such as an SPI, IIC and/or UART bus.

BRIEF DESCRIPTION OF THE DRAWINGS

In the following preferred embodiments of the invention will be described in greater detail, by way of example only, making reference to drawings in which.

DETAILED DESCRIPTION

Figure 1:
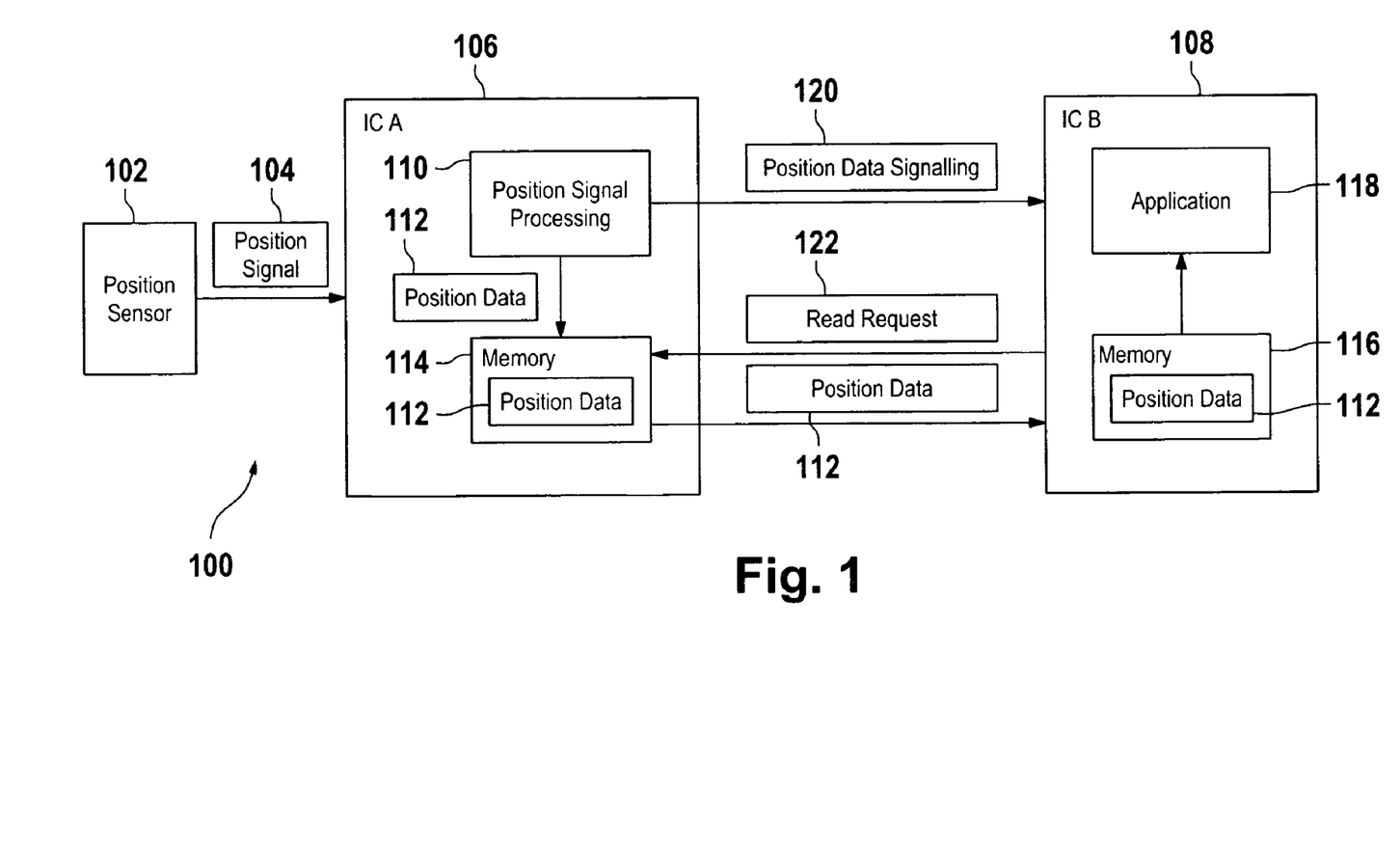
FIG. 1 is a block diagram of a first embodiment of an electronic device.

FIG. 1 shows an electronic device 100 that has a position sensor 102 for providing a position signal 104 to an integrated circuit A 106. The integrated circuit A106 is coupled to an integrated circuit B 108. The integrated circuit A 106 has a position signal processing component 110 for processing the position signal 104. The position signal processing component 110 provides position data 112 as a result of its processing of the position signal 104. The position data 112 is written into a memory 114. Preferably the memory 114 forms an integral part of the integrated circuit 108.

The integrated circuit B 108 is coupled to a memory 116. Preferably the memory 116 forms an integral part of the integrated circuit B 108. The memory 116 serves for storage of the position data 112. The integrated circuit B 108 serves for execution of a program, such as an application program or an operating system that requires the position data 112.

In operation the position sensor 102 provides a position signal 104 to the integrated circuit A 106. The position signal 104 is processed by the position signal processing component 110. The resultant position data 112 is written into the memory 114.

Further, the position signal processing component sends position data signalling information 120 to the integrated circuit B 108 after acquisition of the position data 112. In response to the position data signalling information 120 the integrated circuit B 108 can send a read request 122 in order to read the position data 112 from the memory 114. In response to the read request 122 the position data 112 is transferred from the memory 114 to the memory 116 of the integrated circuit B 108. The position data 112 can be read from the memory 116 by the program 118 for further processing.

It is to be noted that the position data signalling information 120 that is sent from the position signal processing component 110 after acquisition of the position data 112 to the integrated circuit B 108 facilitates to reduce the power consumption of the integrated circuit B 108 as it reduces the data processing load of the integrated circuit B 108. This is due to the fact that the integrated circuit B 108 will only read the position data 112 from the memory 114 after receipt of the position data signalling information 120. This avoids a need for the integrated circuit B 108 to permanently check the memory 114 for the presence of new position data 112.

Figure 2:
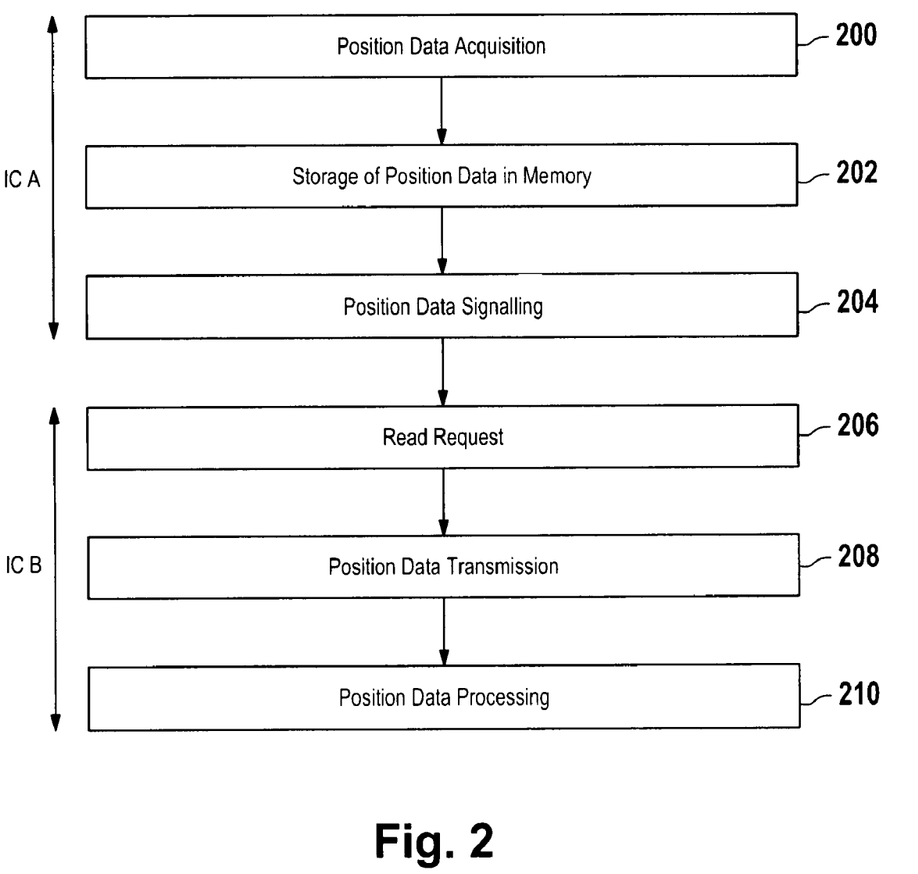
FIG. 2 is a flow chart illustrating a preferred mode of operation of the electronic device of FIG. 1.

FIG. 2 shows a corresponding flow chart. In step 200 the integrated circuit A performs a position data acquisition. The acquired position data is stored in the memory in step 202. Consecutively or in parallel position data signalling information is sent to the integrated circuit B (step 204) in order to signal the availability of up-to-date position data.

In response to the position data signalling information the integrated circuit B initiates a read operation in order to read the position data from the memory. The integrated circuit B sends a read request to the integrated circuit A (step 206). In response the integrated circuit B receives the position data, i.e. the position data is transmitted from the memory of the integrated circuit A to the integrated circuit B (step 208). In the following the integrated circuit B can perform various data processing operations on the basis of the received position data for various purposes (step 210).

Figure 3:
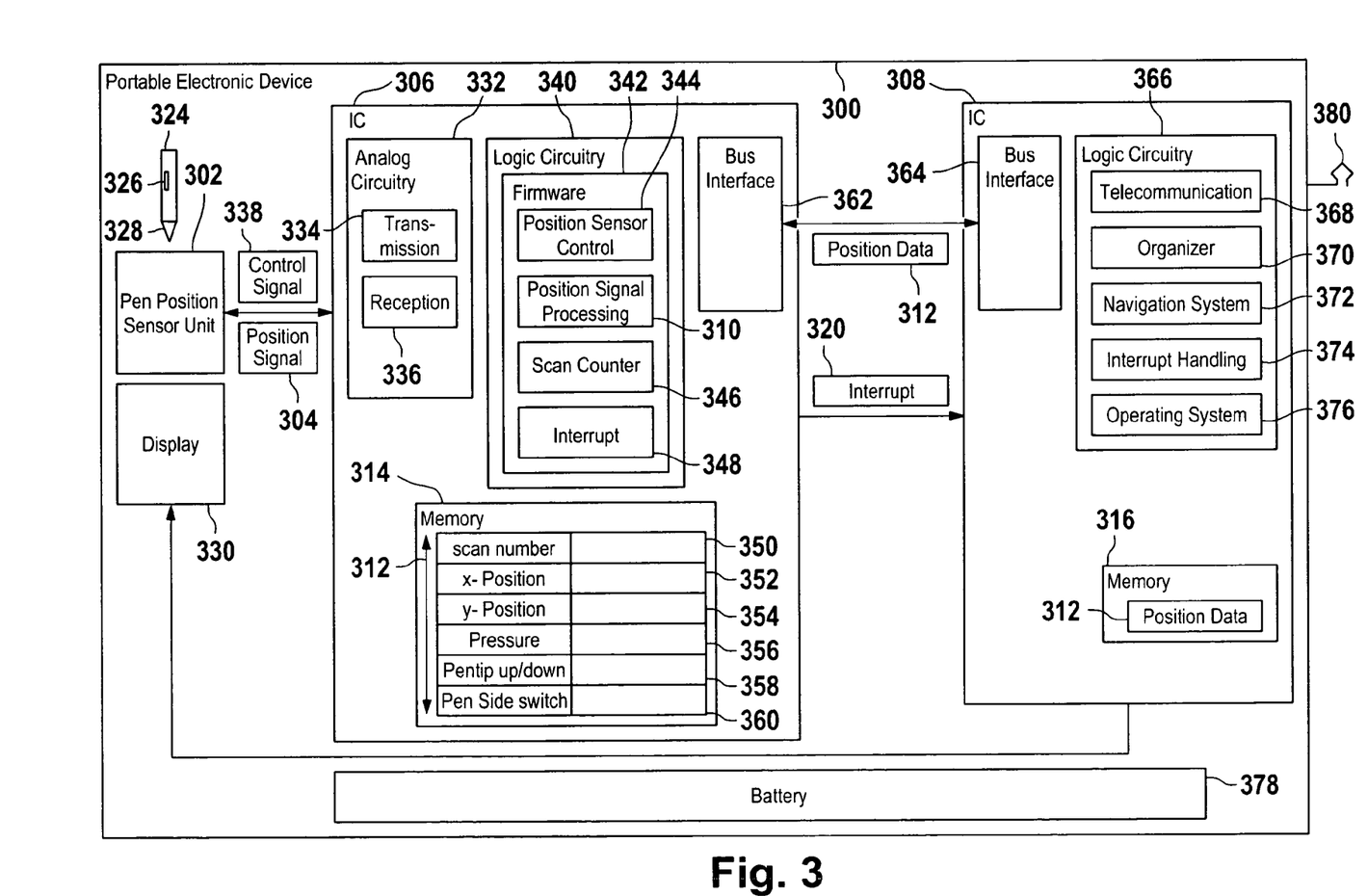
FIG. 3 is a block diagram of a portable electronic device.

FIG. 3 shows a block diagram of a portable electronic device. Elements of FIG. 3 that correspond to elements of the embodiment of FIG. 1 are designated by like reference numerals.

The portable electronic device 300 has a position sensor 302 for sensing the position of an entry pen 324. The entry pen 324 has a side switch 326 that can be operated by a user and a pen tip 328. The position sensor 302 is located behind a display 330 of the portable electronic device 300. For example, the display 330 is a liquid crystal display or an organic light emitting diode (OLED) display.

The position sensor 302 senses the position of the entry pen 324 relative to the display 330 by electromagnetic coupling.

In addition to the position detection, the position sensor 302 receives electromagnetic signals from the entry pen 324 that indicate a switch position of the side switch 326 and/or whether the pen tip 328 is depressed or not. Alternatively or in addition the position sensor 302 can receive electromagnetic signals from the entry pen 324 that indicate the pressure with which the pen tip 328 is depressed against the external surface of the display 330.

The integrated circuit 306 has analogue circuitry 332 that comprises a transmission component 334 and a reception component 336. The transmission component 334 and the reception component 336 serve to generate control signals 338 for controlling the transmission of electromagnetic signals from the position sensor 302 to the entry pen 324 and the reception of electromagnetic signals from the entry pen 324 by the position sensor 302. The resultant position signal 304 that carries the position information is received by the reception component 336, which provides the sampled position signal 304 to the position signal processing component 310.

The position signal processing component 310 belongs to logic circuitry 340 of the integrated circuit 306. In the preferred embodiment considered here, the position signal processing component 310 is provided by a set of instructions of the firmware 342 which is executed by the logic circuitry 340.

In addition, the firmware 342 has a position sensor control component 344 which is a set of firmware instructions for controlling overall operation of the position sensor 302 and the analogue circuitry 332. Further, the firmware 342 has a generator component 346 which is a set of firmware instructions for generating an identifier for each position data set that is provided by the position signal processing component 310. The interrupt component 348 is a set of firmware instructions for generating an interrupt 320 when a new acquisition scan of the position data is performed.

Further, the integrated circuit 306 has a memory 312. The memory 312 has a predefined memory location 350 for storing the identifier of a position data set. The memory 312 has predefined memory locations 352, 354, 356, 358 and 360. These memory locations 352 to 360 serve for storage of a complete position data set.

A complete position data set can consists of a sensed x-position and y-position of the entry pen 324, pressure data indicative of the pressure with which the pen tip 328 of the entry pen 324 is depressed against the display 330, a pen tip up/down bit indicating whether the pen tip 328 is depressed against the display 330 or not, and pen side switch information indicating the position of the side switch 326 of the entry pen 324.

The memory location 352 is permanently assigned to the x-position, the memory location 354 is assigned to the y-position, the memory location 356 is assigned to the pressure data, the memory location 358 is assigned to the pen tip up/down bit, and the memory location 360 is assigned to the pen side switch information. In other words the memory 312 has a memory mapped area where each component of a position data set and the identifier of the position data set is always stored on a predefined memory location.

The integrated circuit 306 has a bus interface 362 for sending a position data set 312 and its identifier to an integrated circuit 308. The integrated circuit 308 has a bus interface 364. For example, the bus interfaces 362 and 364 connect the integrated circuits 306 and 308 by means of a data bus such as the SPI, IIC and/or UART data busses.

The integrated circuit 308 has logic circuitry 366 for execution of various program components. For example, the logic circuitry 366 can serve for execution of a program component 368 for providing a telecommunication functionality, such as a mobile telephony functionality, a program component 370 for providing an electronic organizer functionality, a program component 372 for providing a navigation system, a program component 374 for interrupt handling and/or a program component 376 for providing an operating system.

The integrated circuit 308 has a memory 316 for storing the position data set 312.

The portable electronic device 300 has a battery 378 for providing power to the various components of the portable electronic device including the integrated circuit 308.

The display 330 is coupled to the integrated circuit 308, such as for display of a graphical user interface provided by the program component 376 for the display of various information and user, data related to one or more of the functionalities provided by the program components 368, 370 and 372.

The portable electronic device 300 can have an integrated antenna 380 for the telecommunication functionality. Likewise, the antenna 380 can be required for providing a navigation functionality such as for reception of GPS (Global position system) signals.

In operation a user of the portable electronic device 300 can input data by positioning the entry pen 324 on the display 330. In addition, the user can operate the side switch 326 and/or vary the pressure with which the pen tip 328 is depressed against the surface of the display 330 for the input of data.

The analogue circuitry 332 is controlled by the position sensor control component 344 to provide control signals 338 to the position sensor 302 for acquisition of a position signal 304. The position signal 304 is analogue to digital converted and provided to the position signal processing component 310 in order to extract the position data set 312 from the digitized position signal 304.

The generator component 346 provides an identifier for the new position data set 312. In the preferred embodiment considered here, the generator component 346 is implemented as a scan counter which counts the data acquisitions of position data sets 312 performed by the position sensor control component 344. With each position data acquisition scan that is performed by the position sensor 302 under the control of the position sensor control component 344 the scan counter is incremented or decremented depending on the implementation.

The position signal processing component 310 writes the position data set 312 and the scan number provided by the generator component 346 to the memory mapped area of the memory 314. In other words, the scan number is written to the memory location 350, the x-position data to the memory location 352, the y-position data to the memory location 354, the pressure information to the memory location 356, the pen tip up/down bit to the memory location 358 and the pen side switch information to the memory location 360.

When the scan number and the new position data set 312 is written to the memory 314 the interrupt component 348 is invoked in order to generate an interrupt 320 which is sent from the integrated circuit 306 to the integrated circuit 308.

The interrupt 320 is received by the program component 374. In response a read operation of the memory mapped area of the memory 314 is performed by the integrated circuit 308 by means of its bus interface 364. For example, the integrated circuit 308 reads the memory mapped area from the memory location 350 to the memory location 360 in sequential order. After these read operations the integrated circuit 308 performs another read operation in order to read the memory location 350 again. If the content of the memory location 350 is the same for both the initial read operation and the read operation after having read the data set 312, this indicates that the data set 312 is valid. If the contrary is the case, this indicates that the position signal processing component 310 has performed another write operation of a new position data set while the integrated circuit 308 has attempted to read the previous position data set 312. In the latter case the integrated circuit 308 retries to read the content of the memory mapped area of the memory 314 for reading the consecutive up-to-date position data set 312.

The position data set 312 is stored in the memory 316 of the integrated circuit 308 for access by the program components 368, 370 and/or 372.

The program component 374 can prioritize the various interrupts it can receive e.g. from the program components 368, 370 and/or 372 and the interrupt 320. For example, if the user requires to make an emergency telephone call using the telecommunication functionality provided by the program component 368 the respective interrupt that is generated by the program component 368 has a higher priority than the interrupt 320 such that processing of the interrupt 320 is delayed.

Figure 4:
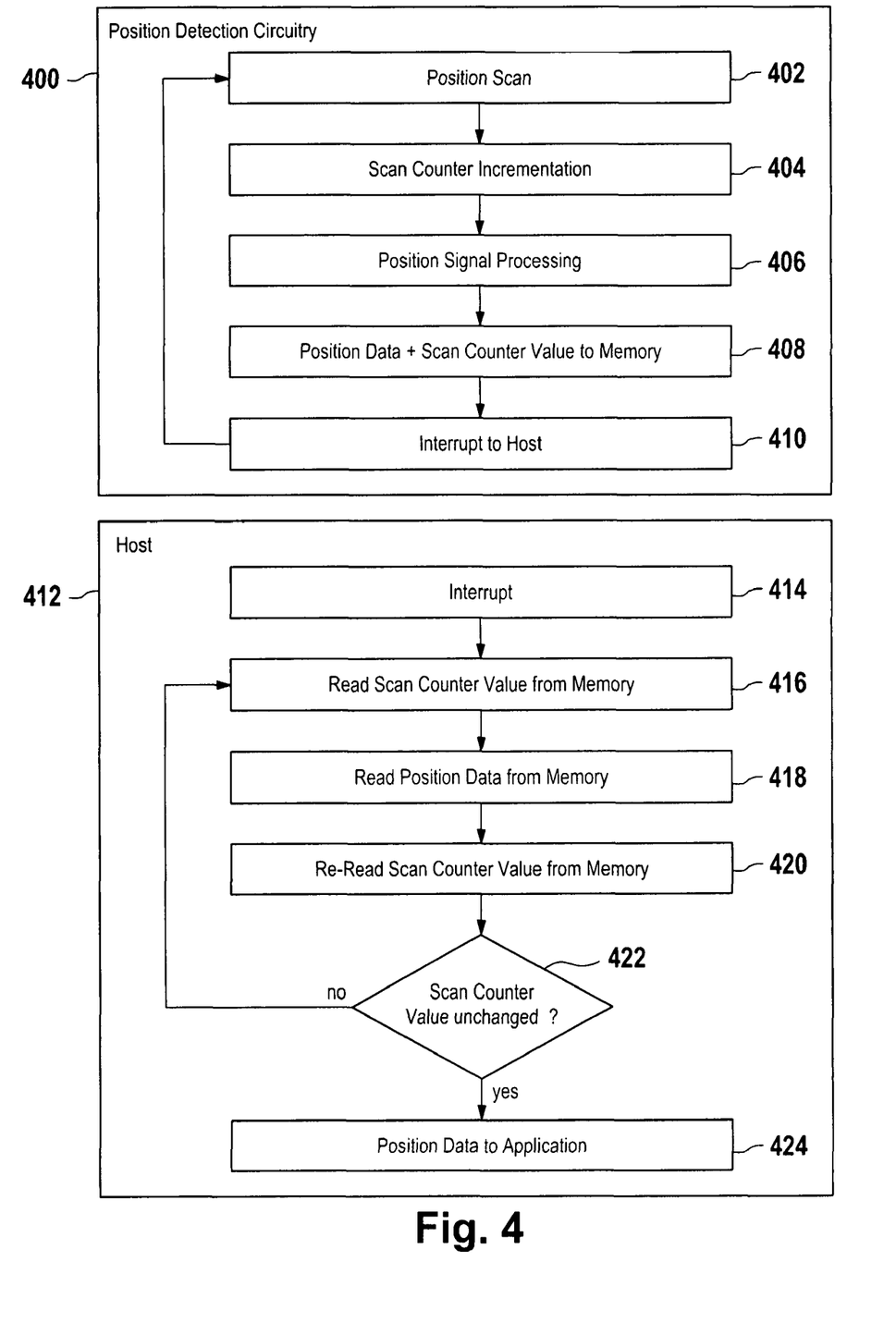
FIG. 4 is a flow diagram showing a preferred mode of operation of the portable electronic device of FIG. 3.

FIG. 4 shows a corresponding diagram illustrating the operation of the portable electronic device of FIG. 3. As shown in FIG. 4 the operation of the position detection circuitry provided by the position sensor 302 and the integrated circuit 306 and operation of the host processor provided by the integrated circuit 308 is independent and asynchronous.

The process 400 performed by the position detection circuitry comprises the following steps:

In step 402 a position scan is performed for acquisition of a position data set. In step 404 the scan counter is incremented or decremented. The position signal acquired from the position scan performed in step 402 is processed in step 406 which provides the position data set. The position data set and the scan counter value are stored in a memory mapped storage region (step 408). Further, an interrupt is sent to the host processor in step 410 in order to signal the availability of up-to-date position data in the memory mapped storage region. From step 410 the control goes back to step 402 for performance of a consecutive position data acquisition.

The process 412 performed by the host processor comprises the following steps:

In step 414 the host processor receives the interrupt from the position detection circuitry (cf. step 410). In response the host processor reads the scan counter value from the memory mapped storage region (step 416). Next, the host processor reads the position data set from the memory mapped storage region (step 418). In step 420 the host processor re-reads the scan counter value from the memory mapped storage region.

If the scan counter values that have been read in the steps 416 and 420 are identical, this implies that the position data set that has been read in step 418 is valid (step 422) and the position data set is provided to an application for further processing (step 424). If the contrary is the case, this implies that the position data set was in the process of being overwritten with a new position data set during the read operation performed in step 418. As a consequence the control goes back from step 422 to step 416 in order to perform a new read attempt of valid position data from the memory mapped storage region.

Figure 5:
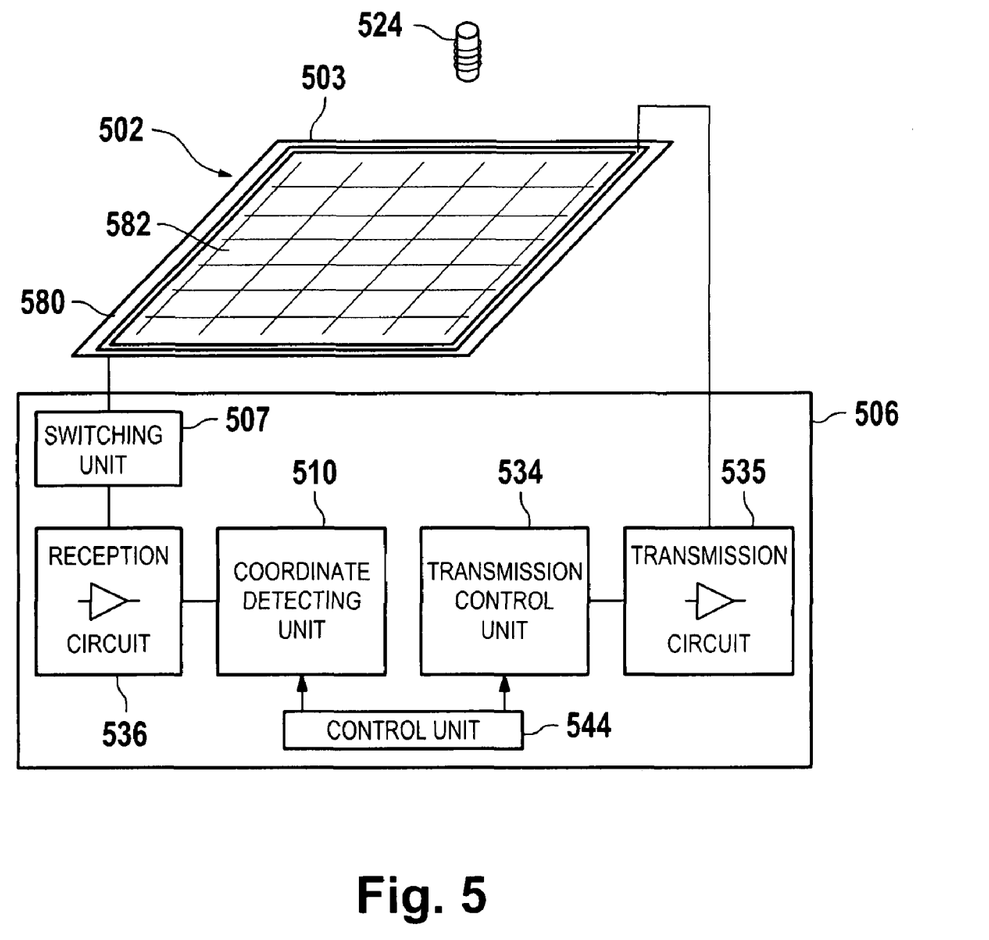
FIG. 5 is a perspective view showing an embodiment of the configuration of the position detecting system of the portable electronic device of FIG. 3.

FIG. 5 shows an exemplary configuration of the position detecting circuitry that is used for acquisition of the position data. Elements in the embodiment of FIG. 5, that correspond to elements in the embodiments of FIGS. 1 and 3 are designated by like reference numerals.

The position detecting system according to the preferred embodiment considered here includes a position indicator 524 for indicating a position and a position detecting apparatus 502 for detecting the position of the position indicator 524.

The position indicator 524 includes at least one coil and indicates a position. For example, the position indicator 524 includes a coil and a capacitor connected to the coil, in which the capacitor and the coil form a resonance circuit.

The position detecting apparatus 502 includes a control unit 544, a transmission control unit 534 for generating position detecting signals, a transmission circuit 535, a sensor unit 503 serving as a sensor area, a switching unit 507 for selecting/switching sensor coils, a reception circuit 536 and a coordinate detection unit 510.

The sensor unit 503, which extends in the plane, includes a transmission coil unit 580 for transmitting position detecting signals for detecting the position of the position indicator 524; and a sensor coil unit 582 for receiving position indicating signals indicating the position of the position indicator 524. The sensor coil unit 582 includes a plurality of sensor coils arranged in the X-directing (X-direction sensor coils) and a plurality of sensor coils arranged in the Y-direction orthogonal to the X-direction (Y-direction sensor coils).

The control unit 544 corresponds to the signal transmitting unit, the receiving unit and the position detecting unit; the transmission control unit 534 and the transmission circuit 535 correspond to the signal transmitting unit; the switching unit 507 and the reception circuit 536 correspond to the receiving unit; and the coordinate detection unit 510 correspond to the position detection unit.

The control unit 544 controls the position detecting apparatus 502 and also controls the transmission control unit 534, the switching unit 507, the reception circuit 536 and the coordinate detection unit 510.

The transmission control unit 534 generates position detecting signals for detecting a position indicated by the position indicator 524 under the control of the control unit 544. The transmission circuit 535 amplifies the position detecting signals from the transmission control unit 534 and supplies the position detecting signals to the transmission coil unit 580, which is provided in the sensor unit 503. Accordingly, the transmission coil unit 580 is driven. The sensor coils are scanned using the switching unit 507 and the reception circuit 536 for position detection by coordinate detection unit 510.

The various components that are required for controlling and driving operation of the position sensor 502 are provided by a mixed analogue/digital application specific integrated circuit 506, which has a similar design as the integrated circuits 106 and 306 of FIGS. 1 and 3, respectively. The components of the integrated circuit 506 related to the storage of position data and interfacing with a host processor are not shown in FIG. 5 for ease of explanation.

LIST OF REFERENCE NUMERALS 100 electronic device
102 position sensor
104 position signal
106 integrated circuit
108 integrated circuit
110 position signal processing component
112 position data
114 memory
116 memory
118 program
120 position data signalling information
122 read request
300 portable electronic device
302 position sensor
304 position signal
306 integrated circuit
308 integrated circuit
310 position signal processing component
312 position data set
314 memory
316 memory
320 interrupt
332 analogue circuitry
334 transmission component
336 reception component
338 control signal
340 logic circuitry
342 firmware
344 position sensor control component
346 generator component
348 interrupt component
350 memory location
352 memory location
354 memory location
356 memory location
358 memory location
360 memory location
362 bus interface
364 bus interface
366 logic circuitry
368 program component
370 program component
372 program component
374 program component
376 program component
378 battery
380 antenna
502 position detecting apparatus
503 sensor unit
506 integrated circuit
507 switching unit
510 coordinate detecting unit
524 position indicator
534 transmission control unit
535 transmission circuit
536 reception circuit
544 control unit
580 transmission coil unit
582 sensor coil unit

The invention claimed is:

1. An electronic device comprising:
a position sensor,
a first integrated circuit component coupled to the position sensor for acquisition of position data,
a memory for storing the position data, and
a second integrated circuit component,
wherein the first integrated circuit component comprises:
control means for repetitively performing the acquisitions to provide position data sets,
generator means for generating an identifier for each position data set,
means for signalling the acquisition of the position data to the second integrated circuit component,
the second integrated circuit component comprising:
means for reading the position data from the memory in response to the signalling.

2. The electronic device of claim 1, wherein the position sensor comprises a touch screen.

3. The electronic device of claim 1, wherein the position sensor is an inductive sensor.

4. The electronic device of claim 1, wherein the position sensor has at least one conductor for electromagnetic coupling with an entry pen.

5. The electronic device of claim 1, wherein the position sensor is positioned behind a display.

6. The electronic device of claim 1, wherein the first integrated circuit component comprises analogue circuitry for driving the position sensor and receiving a position sensor signal, and logic circuitry for processing the position sensor signal in order to provide the position data.

7. The electronic device of claim 1, wherein the generator means has a counter, the counter being adapted to change its counter value with each acquisition, the counter value providing the identifier for the acquired position data set.

8. The electronic device of claim 1, wherein the memory has a first memory location for storing the identifier and second memory locations for storing the position data set.

9. The electronic device of claim 1, wherein the first integrated circuit component is adapted to overwrite the position data stored in the memory after a consecutive acquisition of new position data.

10. The electronic device of claim 9, wherein the first integrated circuit component is adapted to write an identifier of an acquired position data set and the position data set to the memory in a predefined sequential order starting with the identifier of the position data set.

11. The electronic device of claim 1, wherein the means for signalling is adapted to generate a first interrupt for the second integrated circuit component.

12. The electronic device of claim 11, wherein the second integrated circuit component is adapted to receive a second interrupt from an application, the second integrated circuit component comprising means for handling the first and second interrupts.

13. The electronic device of claim 1, wherein the first and second integrated circuit components are coupled by a data bus.

14. The electronic device of claim 13, wherein the data bus is an SPI, an IIC and/or an UART bus.

15. The electronic device of claim 8, wherein the second integrated circuit component has means for reading the memory by sequentially reading the first memory location, the second memory locations and re-reading the first memory location.

16. The electronic device of claim 1, wherein the electronic device is a portable, battery powered device.

17. The electronic device of claim 1, wherein the electronic device is one of a computer, a mobile phone, a personal handy phone system (PHS), a personal digital assistant (PDA), a mobile telecommunication device, a navigation system, an electronic organizer or another portable electronic device.

* * * * *